A. MONTEILHET.
ELECTRIC TRANSMISSION ARRANGEMENT.
APPLICATION FILED MAY 6, 1913.
1,411,366.
Patented Apr. 4, 1922.
_FIG. 1_
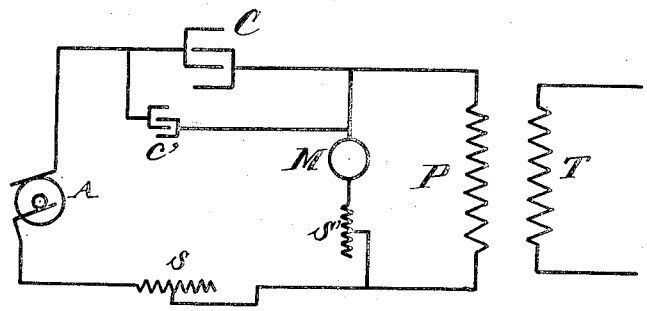
_FIG. 2_
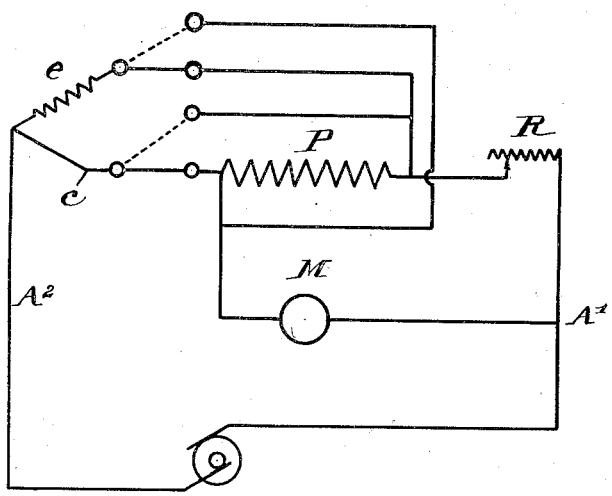

UNITED STATES PATENT OFFICE.

ANTONIN MONTEILHET, OF PARIS, FRANCE, ASSIGNOR TO SOCIETE ANONYME DES TELEGRAPHES EDOUARD BELIN, OF PARIS, FRANCE.

ELECTRIC TRANSMISSION ARRANGEMENT.

1,411,366.  Specification of Letters Patent.  Patented Apr. 4, 1922.

Application filed May 6, 1913. Serial No. 765,920.

(GRANTED UNDER THE PROVISIONS OF THE ACT OF MARCH 3, 1921, 41 STAT. L., 1313.)

*To all whom it may concern:*

Be it known that I, ANTONIN MONTEILHET, citizen of the Republic of France, residing at Paris, in the Republic of France, have invented certain new and useful Improvements in Electric Transmission Arrangements, of which the following is the specification.

One of the difficulties met with in the long distance transmission of electric signals by overhead, underground and submarine lines is the capacity effect of these lines, which capacity is sometimes very great so that continuous current in traversing them experiences a retardation which is often considerable.

The object of the present invention is the employment of alternating current of high frequency in all cases where this difficulty is met with, and particularly for the purposes of telegraphy, the transmission of pictures, and other analogous uses, associated with an optical receiver such as a mirror galvanometer, or an oscillograph, that is to say, a receiver which works with deflection of a luminous beam occasioned by variations in the current traversing an arrangement placed in a suitable magnetic field, or any other galvanoscope having the same effect.

In view of the employment of alternating current, capacity need no longer be taken into account; it is only necessary that the signals to be transmitted should occur at a frequency less than that of the alternation of current and that at the receiver, the optical arrangement should be of high sensitiveness in order that there may not be any fear of trouble in connection with registering.

At the transmitting station the current is produced by an alternator working at a high and variable frequency and the current is sent either directly into the line, or into the primary of a transformer by means of which a high voltage is applied to the line.

It is pointed out that this arrangement is quite distinct from the arrangements using pulsatory or oscillatory current for certain cases of syntonized transmissions.

The apparatus producing the signals will be in series with the primary or the secondary of the transformer.

In those cases where series of identical points are to be transmitted, it is sufficient for the speed of succession of these points to be less than the frequency of the alternating current in order that trouble may not arise, but in certain cases it may be desirable to send into the line a current of variable intensity, the variations being produced, for instance, by the insertion of resistances or by modifying the resistance of a microphone. Disturbances at the receiving apparatus should theoretically be produced since during the return of the spot of light the resistance may have changed, but if the frequency is sufficiently high, especially in relation to the movement of the part which causes these disturbances, the symmetrical points will be lit up once or several times and the impression, either ocular or photographic, will be regular, that is to say, will correspond to the variations produced by the transmitter.

Referring to the drawing—

Figure 1 is a diagrammatic view of a transmitting station employing a shunt connection.

Figure 2 is a similar view incorporating the principles of the Wheatstone bridge.

It is obvious that if the transmitter be of a kind such that its resistance is too small to exert a sufficiently strong action when connected in series with the line, a shunt connection could be used. For instance, when the variations in the resistance of a microphone due to pressures exerted upon its diaphragm are employed at the transmitter the microphone will be connected in parallel with the primary of the transformer.

By this means the diagram forming Figure 1 of the accompanying drawings is obtained. In this diagram A is the alternator, C the principal condenser, c' a variable condenser for the purposes of regulation, P, the primary, and T the secondary of the transformer connected with the line. S and S' are variable resistances provided for purposes of protection and of regulation.

With this system there can be sent with a relatively small power (less than 1 kilowatt) signals or current variations produced in the line by traversing of prints, printing blocks, etc., the transmission being effected to considerable distances and by the employment of cables, without the necessity for taking account of capacity. By reason of the damping action the frequency should be chosen as low as possible.

The arrangement is based on the Wheatstone bridge and is shown in Figure 2 of the drawings. The two branches from one of the terminals A' comprise respectively the microphone M and the regulatable resistance R. The primary P of the transformer forms the diagonal of the bridge.

From the other terminal $A^2$ start two branches, one formed of a high resistance $e$, and the other by a very low resistance which may even be a short circuit $c$, the connections themselves forming this low resistance. If, in this arrangement, a balance has been obtained and pressure is exerted on the diaphragm of the microphone diminishing its resistance, the current will traverse the primary P in a fixed direction changing from one value to a higher value. The first value could correspond to balance conditions that is to say, could be zero.

If now $e$ and $c$ are interchanged by a simple change-over device, as indicated, the balance conditions will be inverted, that is to say, the maximum current would traverse the primary and this current would diminish when pressure was exerted on the diaphragm. With continuous current the polarity will be opposite in the two cases, but this feature does not exist when working with alternating current. If then in the first case the opaque end of the scale of tints corresponds to the weakest current, then the transparency will increase as the pressure on the microphone increases. In the second case the weakest current would correspond to the transparent part and the beam would be returned towards the opaque end of the scale by pressing on the microphone, that is to say, the registered image would be the inverse of the first case. This results from the operation of inverting the connections of $c$ $e$ without touching the scale of tints or any of the regulating devices.

Having now particularly described and ascertained the nature of the said invention and in what manner the same is to be performed, I declare that what I claim is:

In telephotographic systems of transmission, sending apparatus having an alternating current system, a transformer in the alternating current system having one of its elements connected with the sending apparatus, a Wheatstone bridge connection including means for enabling the inversion of the image without changing the sending apparatus or the regulation thereof, and also including said sending apparatus, and a regulating resistance having on one side a very high resistance, and a very low resistance on the other side, the primary of the transformer forming the diagonal whereby by interchanging the two elements in the second part of the bridge the balance conditions are changed, and accordingly the direction of displacement of the luminous beam at the receiver is changed.

In witness whereof I have hereunto signed my name in presence of two subscribing witnesses, this 25th day of April, 1913.

ANTONIN MONTEILHET.

Witnesses:
 JULES MASSON,
 HANSON C. COXE.